US006915725B2

(12) United States Patent
Bridges

(10) Patent No.: US 6,915,725 B2
(45) Date of Patent: Jul. 12, 2005

(54) ENGRAVER'S WORKSTATION

(76) Inventor: Bryan Bridges, 1503 E. La Jolla Dr., Tempe, AZ (US) 85282

(*) Notice: Subject to any disclaimer, the term of this patent is extended or adjusted under 35 U.S.C. 154(b) by 334 days.

(21) Appl. No.: 10/319,296

(22) Filed: Dec. 13, 2002

(65) Prior Publication Data

US 2004/0123762 A1 Jul. 1, 2004

(51) Int. Cl.[7] .................................................. B23B 3/20
(52) U.S. Cl. ............................................ 82/122; 82/115
(58) Field of Search ........................... 82/122, 115, 103, 82/107, 109, 116, 157, 162, 165; 269/13, 46; 134/48, 67, 70, 124

(56) References Cited

U.S. PATENT DOCUMENTS 3,586,079 A * 6/1971 Collins et al. ............. 144/35.1
4,934,422 A * 6/1990 Hempy et al. ........... 144/136.9
4,991,356 A * 2/1991 Ono ............................ 451/27
5,127,639 A * 7/1992 Tucker et al. ............... 269/139
5,544,997 A * 8/1996 Raynor ....................... 414/412
6,352,496 B1 * 3/2002 Oldani ........................ 483/55
6,453,918 B2 * 9/2002 Cardemon ................. 134/135

* cited by examiner

*Primary Examiner*—Willmon Fridie, Jr.
(74) *Attorney, Agent, or Firm*—The Halvorson Law Firm

(57) ABSTRACT

Described is a device that is useful for allowing an engraver, or the like, to have their workpiece rotated without the need to lift their tools from the work piece, and to eliminate hesitation or stopping in the course of engraving circles, spirals, curves, or convoluted shapes. The device is a workstation, such as used by engravers, welders and the like, that comprises a workbench upon which a turntable is mounted. The preferable turntable is mounted to the top of a rotatable post, which projects through the workbench by means of an extension piece. The post is in turn attached to the underside of the workbench and also to the floor (or base plate or other suitably rigid structure such as the workbench or stand) using flanged bearings. Attached to a portion of the post near the floor is a foot operated plate. The operated plate is located in a position such that it is conveniently accessible by a foot of the engraver.

1 Claim, 8 Drawing Sheets

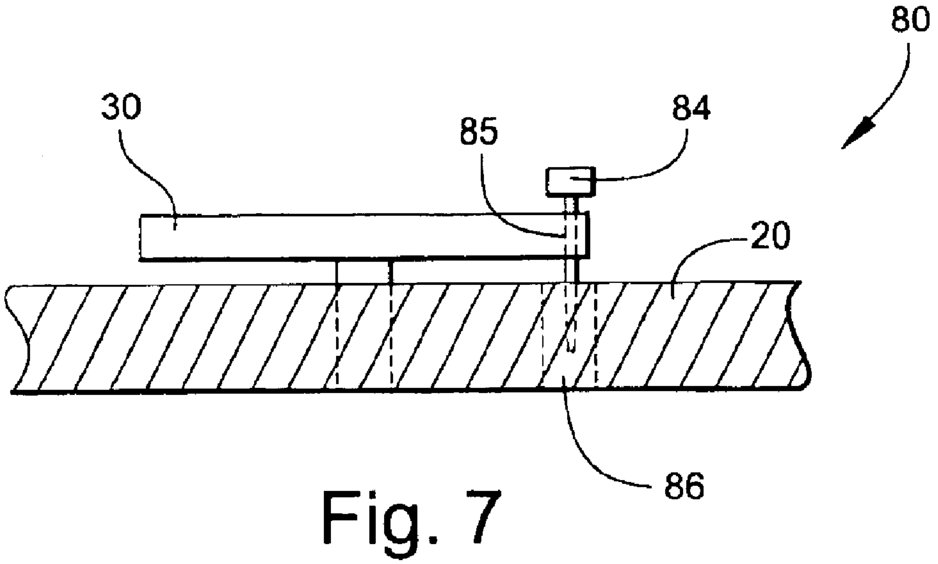
Fig. 7
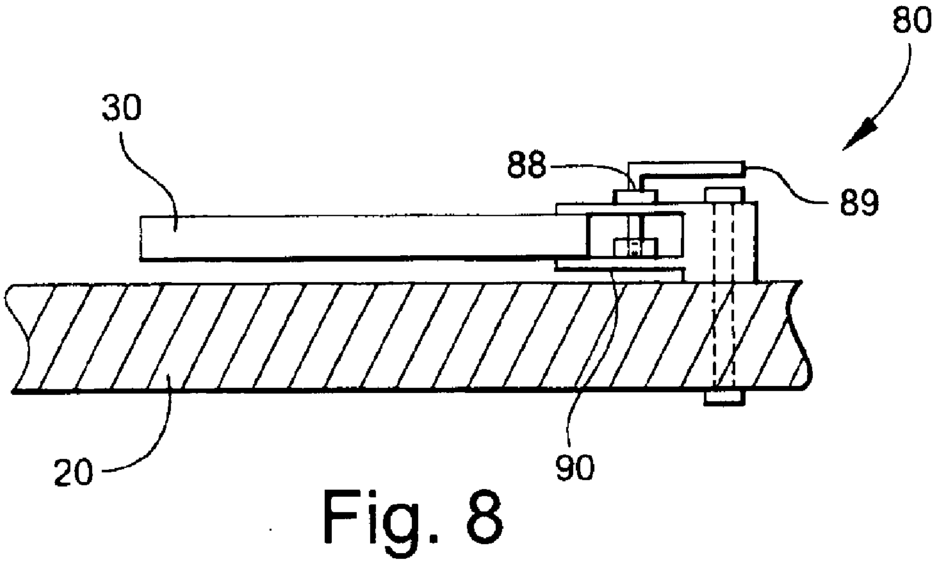
Fig. 8
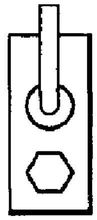

ENGRAVER'S WORKSTATION

FIELD OF THE INVENTION

The present invention relates to workstations for use by engravers, welders and the like.

BACKGROUND

Engraving is a delicate and intricate art. Typical ornamental features, such as a scroll (a spiral design having leaf shapes around its inner perimeter, require complex shapes (the spiral) to be cut. The backbone of the ornamental feature is not the only problem since the ancillary features, such as leaf shapes, are repeated in and around the backbone feature. In deed, ornamental features, such as the scroll, are typically repeated numerous times in an entire design. In addition to the relatively circular problems encountered by designs such as the scroll and lettering, other engraving designs contain irregular outlines, such as foliage or accordion shapes, which require the engraver to make hairpin turns repeatedly.

Since the engraver can only turn his wrist a small portion of arc of a circle, the engraver must cut the first arc and stop to reposition the work piece before continuing the arc. This is repeated until the complex shape is completed.

This method of engraving causes two problems; one of time loss and the other is the difficulty in maintaining good flowing curves with even depth and width. The need to repeatedly stop and reposition the work piece causes considerable time loss of the length of the job, compounded by lapses of engraving quality.

For traditional engravers workstations having a manual turntable to secure the work piece, such as used in the case of the hammer and chisel method of engraving, the hand holding the chisel is frequently the one also used to rotate the turntable. This exacerbates the time loss problem since the engraver must lift the chisel out of the cut for each turn and then reposition the tool in the cut to continue. Engravers using a pneumatic chisel suffer slightly less since they may leave the chisel in the cut while the engraver rotates the turntable. None the less, they also must stop, or hesitate, their engraving while repositioning the job in order to complete their cut.

Thus, there is clearly a present need for an engraver's workstation that does not require the engraver to lift tools from the workpiece and manually rotating a turntable or vise in or in which the work piece is secured.

SUMMARY OF THE INVENTION

It is an object of the present invention to provide a workstation for engravers and the like that includes a motor driven turntable. The drive mechanism for the motor driven turntable further including a foot operated plate that is capable of varying manually the speed of rotation of the turntable, stopping the turntable or reversing the rotational direction of the turntable without adjusting the drive motor. Critically, there is a circularly cross-sectioned drive belt that couples the drive motor to the drive mechanism of the turntable, said circular cross-section necessary to provide the requisite friction/slip for operating the foot operated plat.

It is another object of the present invention to provide the workstation above and further including a centering device capable of quickly and easily centering various portions of a workpiece on the turntable.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 7 is a side view of one embodiment of a turntable locking mechanism according to the present invention.

FIG. 8 is a side view of a second embodiment of a turntable locking mechanism according to the present invention.

DESCRIPTION OF PREFERRED EMBODIMENTS

Figure 1:
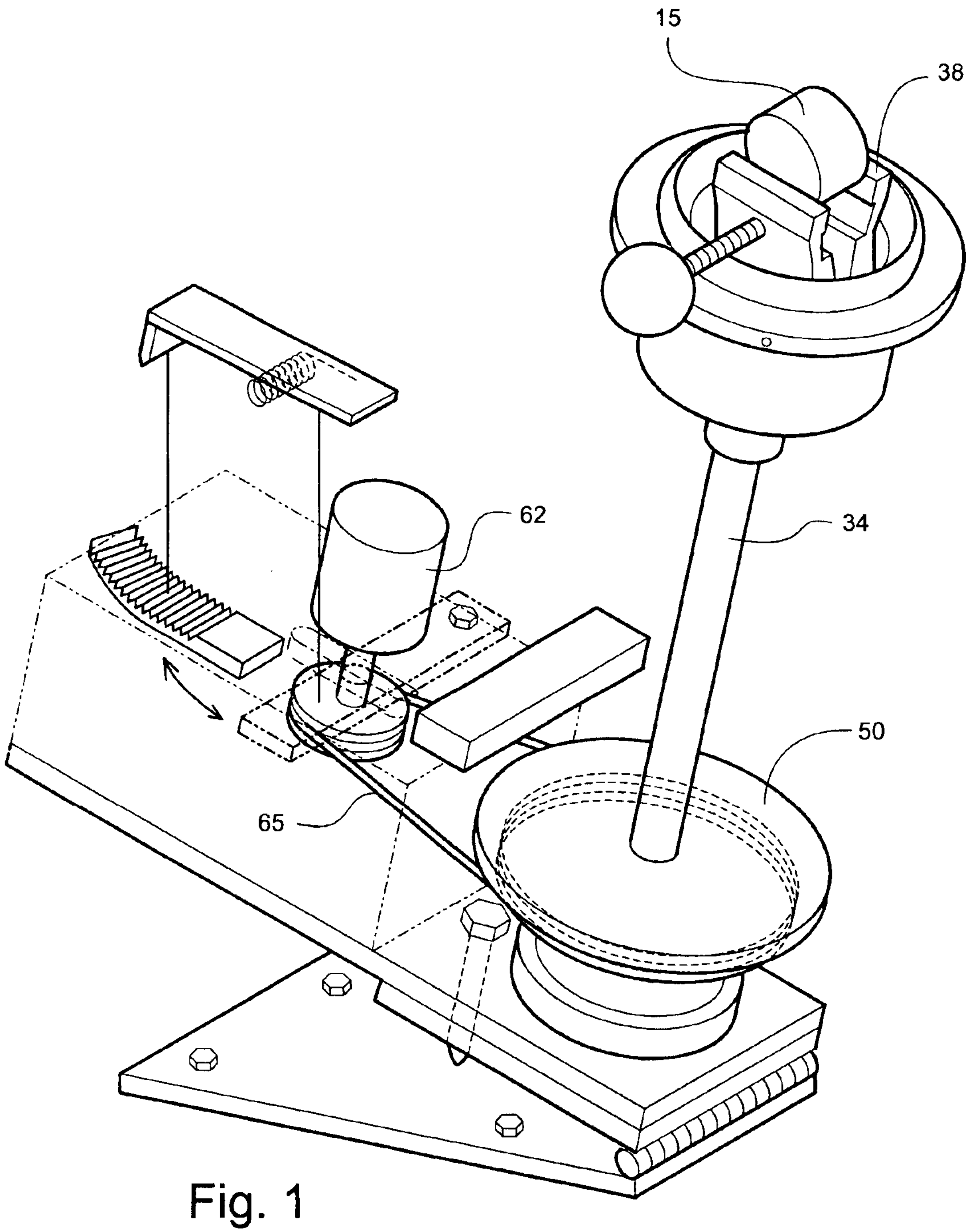
FIG. 1 is a perspective view of an embodiment of the present invention.
Figure 2:
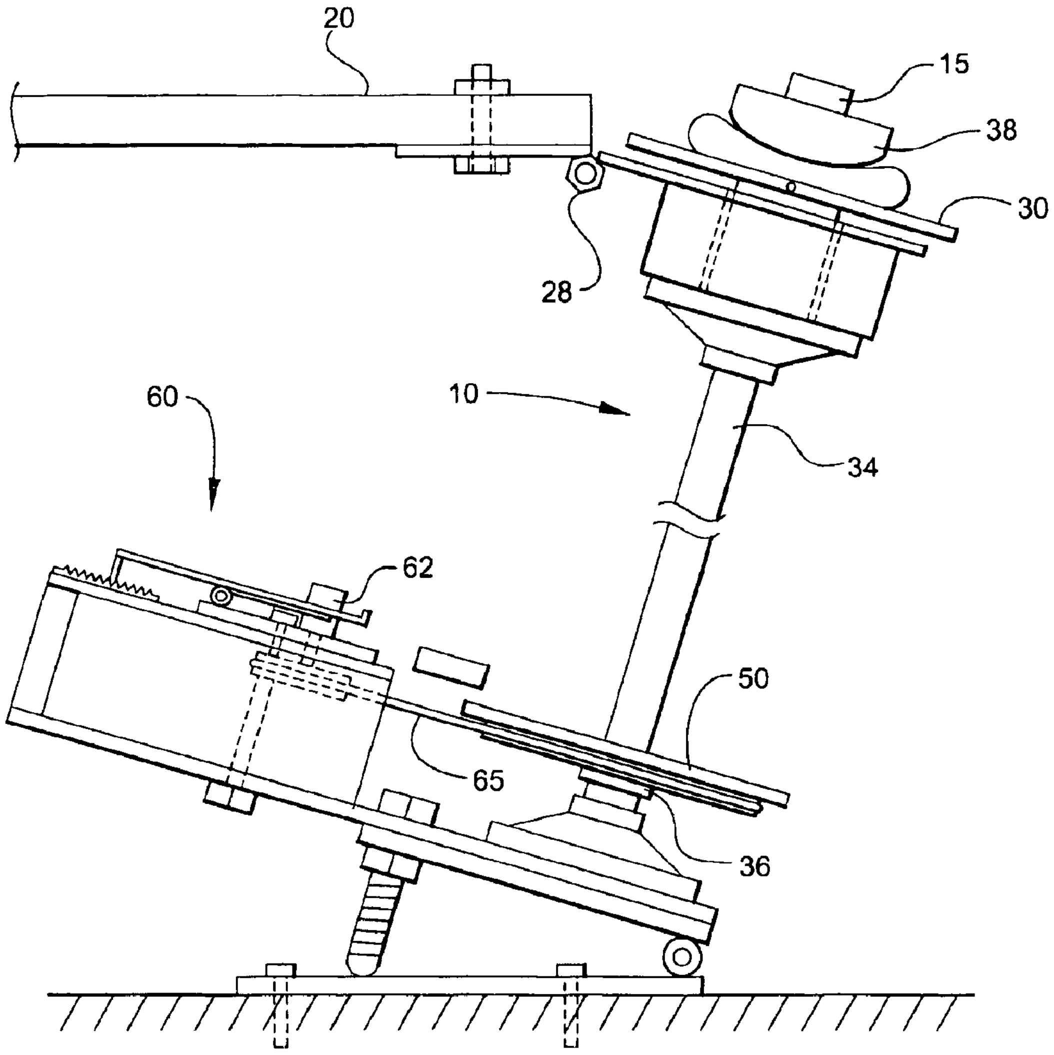
FIG. 2 is a side view of the present invention.
Figure 3:
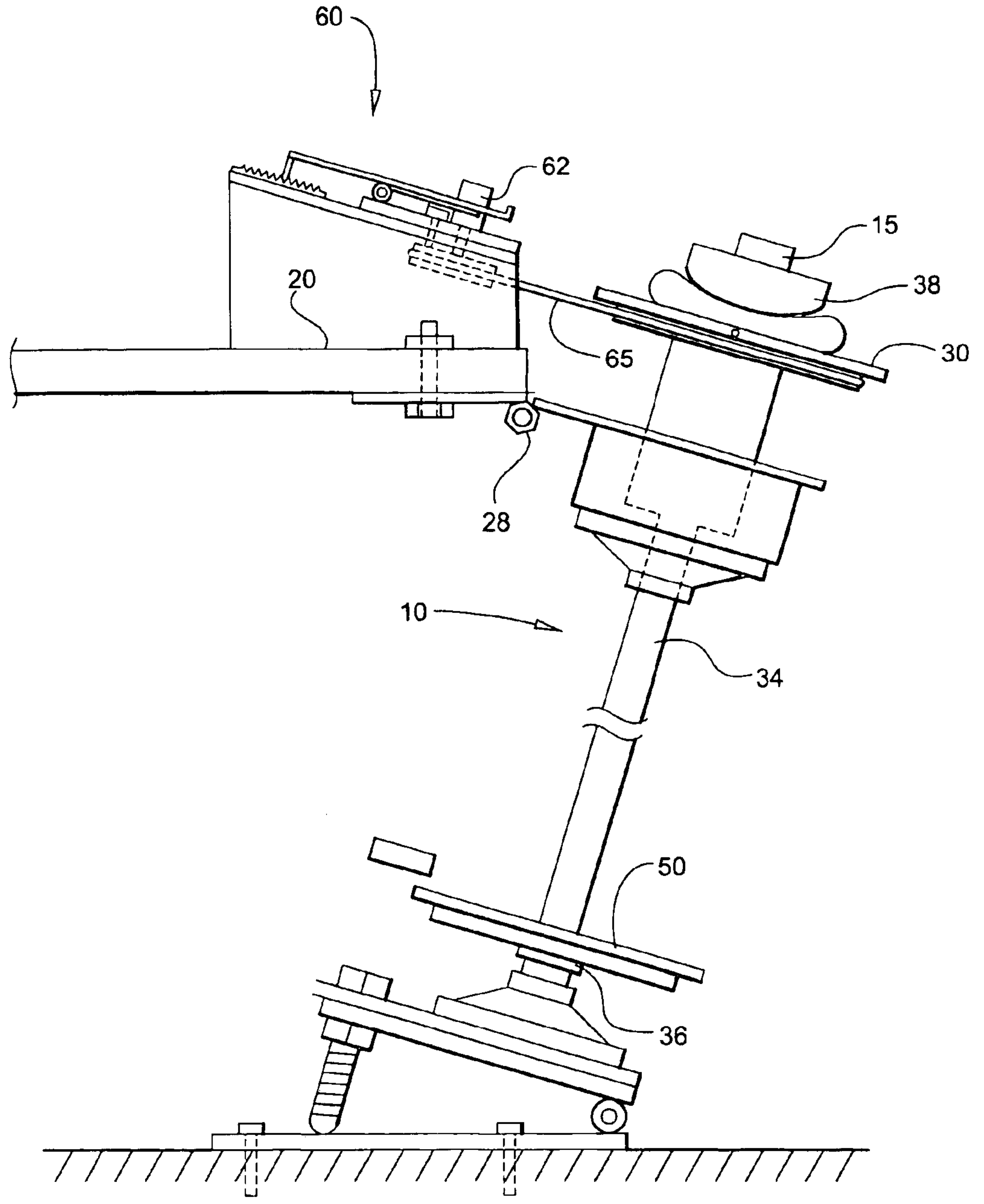
FIG. 3 is a side view of a second embodiment of the present invention.
Figure 4:
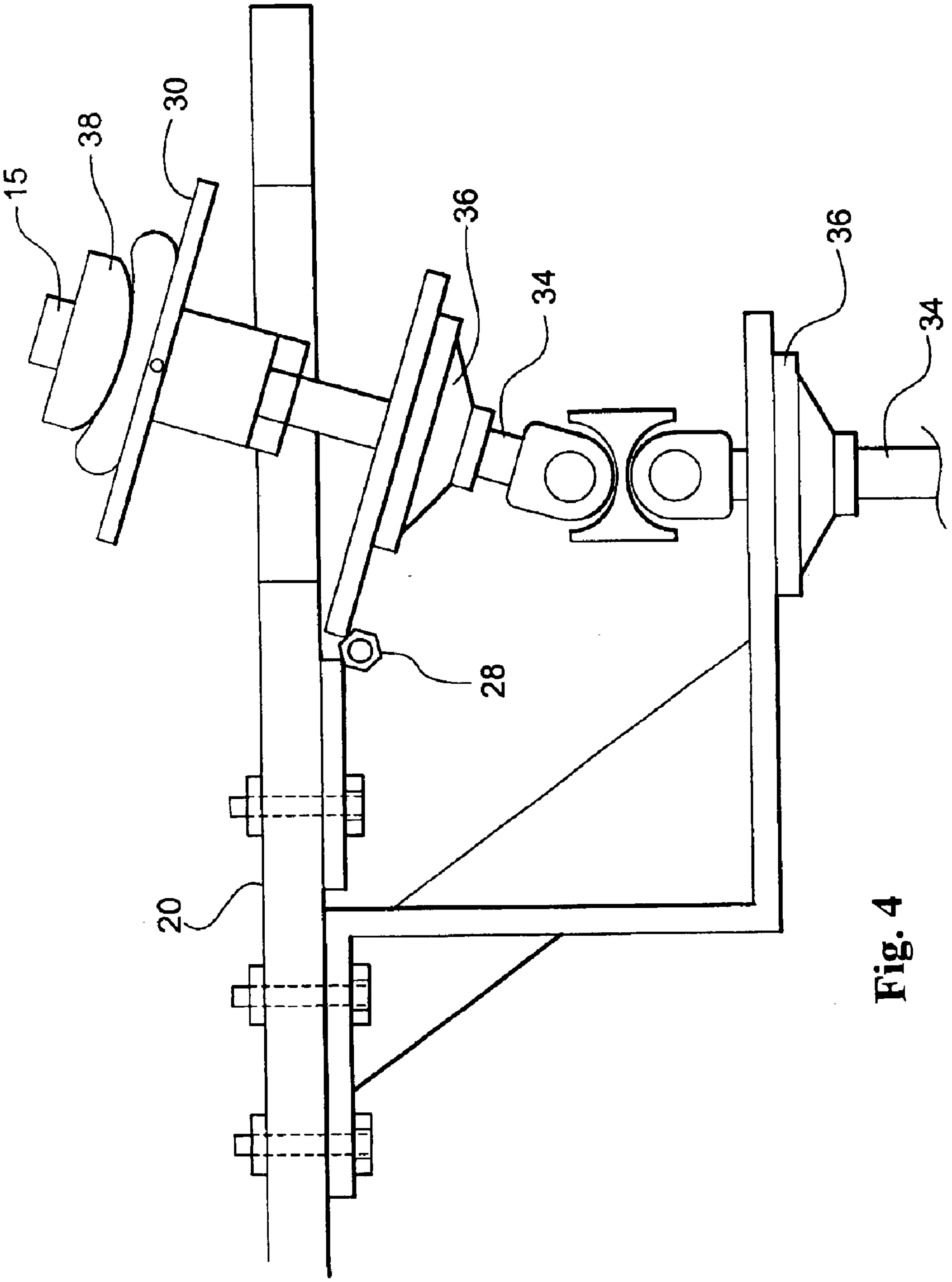
FIG. 4 is a side view of the drive mechanism of the present invention illustrating the use of a pivotal rotation joint in the drive mechanism.
Figure 5:
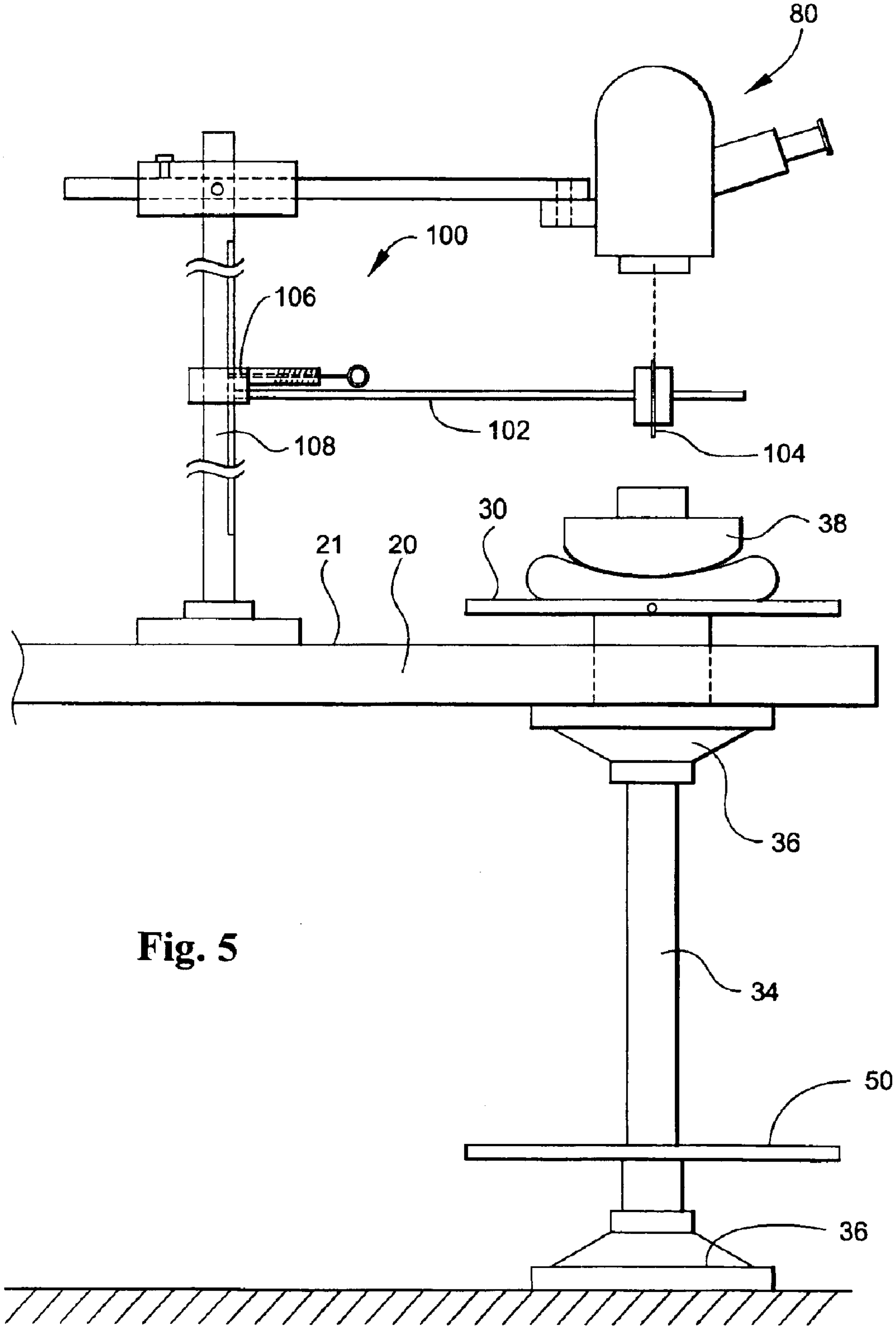
FIG. 5 is a side view of the centering device according to the present invention.
Figure 6:
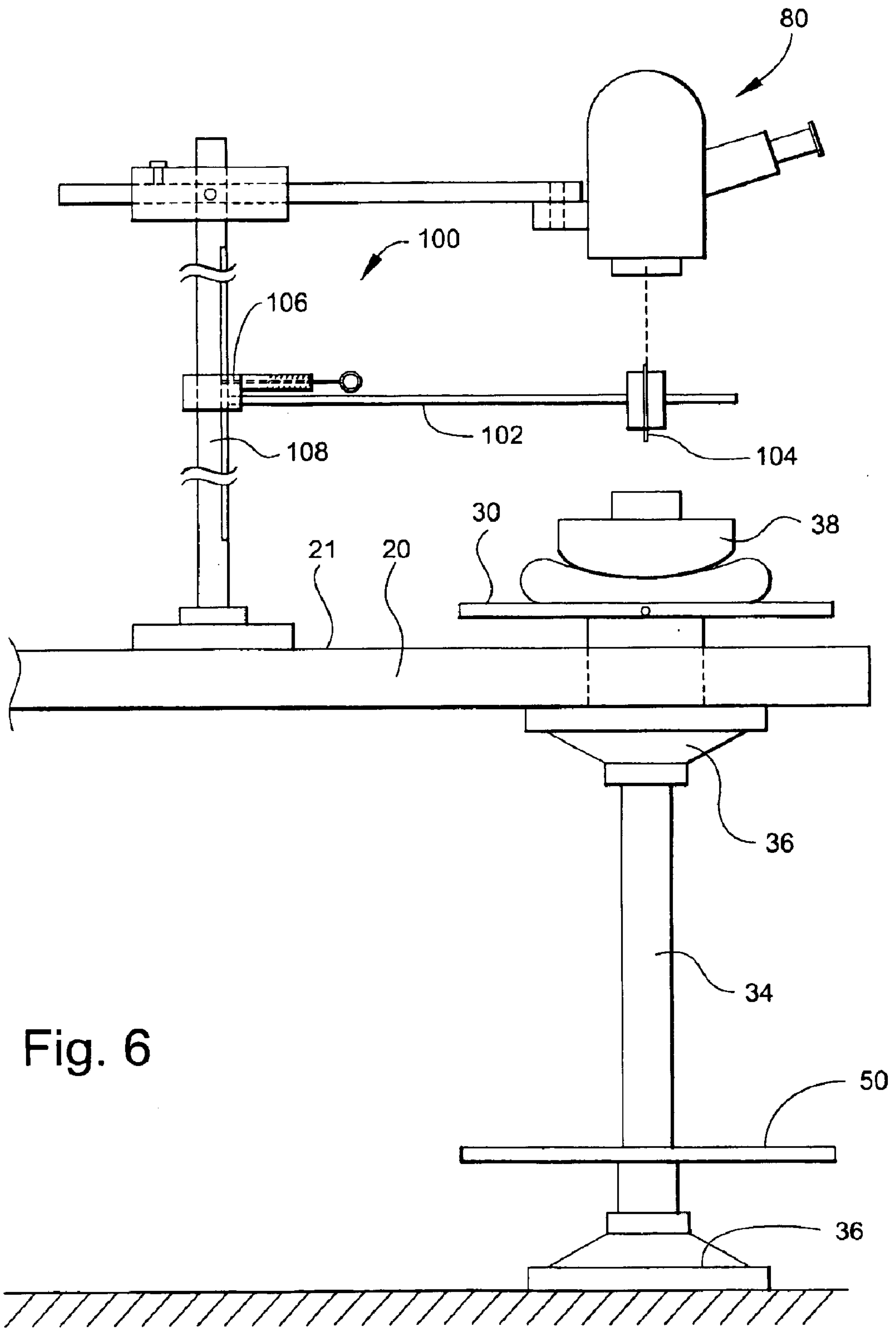
FIG. 6 is a side view of the centering device according to the present invention.
Figure 9:
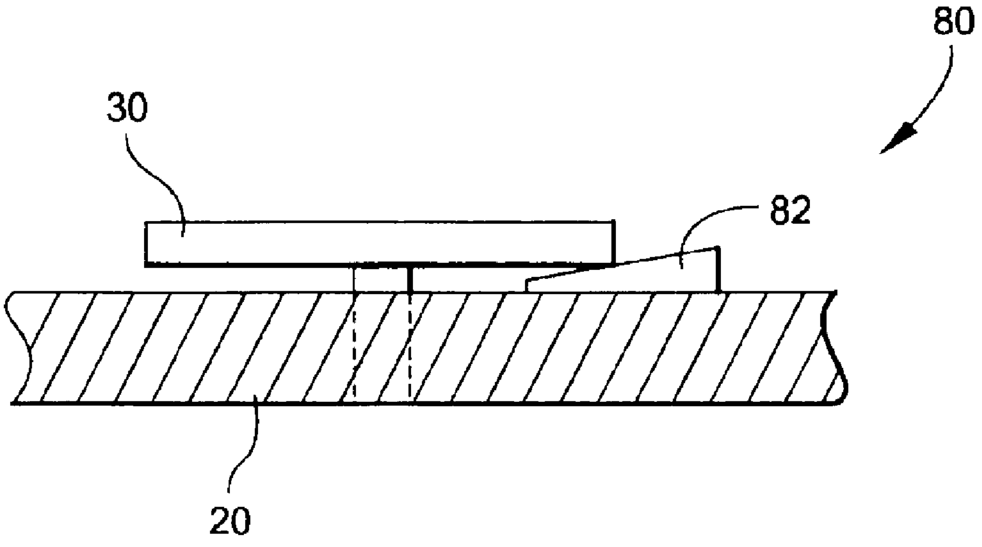
FIG. 9 is a side view of a third embodiment of a turntable locking mechanism according to the present invention.

The present invention is a device that is useful for allowing an engraver, or the like, to have their workpiece rotated without the need to lift their tools from the work piece, and to eliminate hesitation or stopping in the course of engraving circles, spirals, curves, or convoluted shapes.

With reference to the drawings, the present invention is a workstation 10, such as used by engravers, welders and the like, that comprises a workbench 20 upon which a turntable 30 is mounted. The preferable turntable 30 is a 12-inch turntable having a 4-inch centered removable lid 32, mounted to the top of a rotatable post 34, which projects through the workbench 20 by means of an extension piece. The post 34 is in turn attached to the underside of the workbench 20 and also to the floor (or base plate or other suitably rigid structure such as the workbench or stand) using flanged bearings 36.

Attached to a portion of the post 34 near the floor is a foot operated plate 50. The operated plate 50 is located in a position such that it is conveniently accessible by a foot of the engraver.

In an alternate embodiment, the turntable 30 may be mounted on a portion of the workbench 20 that has a pivotable hinge 28, thus allowing the turntable 30, with mounted workpiece 15 to be positioned in a convenient work angle, relative to the engraver. In yet another embodiment, there is a pivoting joint 42, such as a constant velocity joint that is inserted in the post 34, between the foot operated plate 50 and the turntable 30. The pivoting joint 42 allows the foot operated plate 50 to be at a different angle relative to the turntable 30.

There is a drive motor 60, preferably 12-volt, that drives the turntable 30 using a circularly cross-sectioned belt 65, such as a 15-inch diameter O-ring, that extends between the drive motor 60 and the foot operated plate 50 attached to the post 34 (bottom mounted drive motor). Alternately, the belt 65 may extend between the drive motor 60 and the turntable 30 or to the extension piece itself for extra speed (top mounted drive motor).

Preferably, there is a belt tensioning apparatus 70 that either manually or automatically maintains or varies the tension of the belt 65. In the preferred embodiment, the tension on the belt 65 is such that use of the foot operated plate 50 allows the engraver to vary the speed of rotation, stop the rotation, or reverse the rotation of the turntable 30 without the need to adjust the drive motor 60. This is accomplished via slip between the belt 65 and either the drive motor 60 or the foot operated plate 50 (bottom mounted drive motor), post 34 (bottom mounted drive motor), or turntable 30 (top mounted drive motor). The circular cross-sectioned drive belt 65 has been found crucial for providing the necessary amount of friction/slip to accomplish this. In a preferred embodiment, the foot operated belt tensioning apparatus 70 has a foot petal 72 pivotally attached to either the workbench 20 or drive motor 60 and may include a ratchet-like locking tooth 74 and catch 76 mechanism to set the tension.

Preferably attached to the turntable 30 is a vice 38. Preferably, the vice 38 is attached to the turntable 30 using a removable attachment means such as magnets or the like or by its own weight.

Also preferably attached to the turntable 30 is a stereo microscope 80. Most preferable, the stereo microscope 80 is one with crosshairs in the optics.

Finally, there is also preferably a locking mechanism 80, which locks the turntable 30 in place, as desired. The locking mechanism 80 preferably interacts directly with the turntable 30. However, alternate locking mechanism, which may interact with other components of the workstation 10 may be used and still fall within the scope of the present invention. In one embodiment, the locking mechanism 80 is a simple wedge 82 that may be manually inserted between the turntable 30 and the workbench 20, thereby locking the turntable 30 in place relative to the workbench 20 via friction or pressure (on the wedge). In another embodiment, the locking mechanism 80 may be a pin and aperture system where a pin 84 is inserted into a first aperture 85 located in the turntable 30 and into a coaxially located second aperture 86 located in the workbench 20, thereby prevent unwanted rotation of the turntable 30. In yet another embodiment, the locking mechanism 80 may be a clamp mechanism where a clamp 88 is mounted on the workbench 20 and receives the outer periphery of the turntable 30. A locking handle 89 causes two clamp arms 90 to engage the outer periphery of the turntable 30 and, via pressure or friction, prevents unwanted rotation of the turntable 30 relative to the workbench 20.

In a preferred embodiment, the drive motor 60 is an integral solid state 12V drive motor 62 and power source (not shown), which include the following features: transformation of 110V AC to 12V DC; a short ramp start (which eliminates jerk starts); a tool touch instant turntable start; a variable top motor speed (set by each operator) torque compensation at any speed; two separate speed controls, each providing infinitely variable speed control (one a foot potentiometer and the other a hand potentiometer); a forward rotational direction and a reverse rotational direction. Additionally there should be an on/off switch for the motor, an on/off switch for the tool touch instant start, a switch for alternating between foot and potentiometers and a switch in the foot potentiometer that overrides the hand potentiometer.

In a preferred embodiment, there is a center finding device 100 for centering a portion of the design to be engraved over the center of the turntable 30. This device 100 comprises a horizontal shaft 102, or arm, with a vertical point 104, or centering pin, movably attached at its distal end. The shaft 102 is mounted using a collar 106 attached to a vertical post 108. The vertical post 108 is, in turn, mounted to the top 21 of the workbench 20. The collar 106 is movable both rotationally and vertically to allow the horizontal shaft 102 to be swiveled over the center of the turntable 30. The piece to be engraved 15, which is held in the vise 38, is manually located under the centering pin 104. After the workpiece 15 is properly located, the horizontal shaft 102 is moved to a non-obstructing position. At this point, the portion of the design to be engraved is centered over the turntable 30 and is ready for the engraving process. The center finding device 100 is important since many workpieces 15 require numerous different portions to be centered and the quick and easy centering of these portions reduces the time required to complete any design.

In use, a workpiece 15 is secured to the vise 38. The portion of the workpiece that is to be engraved is centered on the turntable 30 by locating or relocating the vice 38. The turntable 30 is rotated, using one of two methods: 1) using the drive motor 60 or 2) using the foot operated plate 50 that is attached near the bottom of the post 34. When the turntable 30 is rotated using the drive motor 60, the foot operated plate 50 may be used as either a clutch or a brake for the drive motor 60. Also the foot operated plate 50 may reverse or slow the rotation of the turntable 30 caused by the drive motor 60.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well.

Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A device for working on work pieces comprising:

a. A workbench;

b. a rotatable post mounted through an aperture in the workbench;

c. a rotational turntable mounted to the an end of the rotatable post;

d. a drive motor for turning the rotational turntable, coupled to the rotatable post by a belt having a circular cross-section; and e. a foot operated plate that is attached to a second end of the rotatable post and positions such that it is conveniently accessible by a foot of a user.

* * * * *